US010433262B1

(12) United States Patent
Barnes et al.

(10) Patent No.: US 10,433,262 B1
(45) Date of Patent: Oct. 1, 2019

(54) DENSITY OPTIMIZED BLUETOOTH ANTENNA

(71) Applicant: Panasonic Avionics Corporation, Lake Forest, CA (US)

(72) Inventors: Andrew Barnes, Mission Viejo, CA (US); Sunil Solanki, Irvine, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 15/933,187

(22) Filed: Mar. 22, 2018

(51) Int. Cl.
| | |
|---|---|
| *H04B 7/00* | (2006.01) |
| *H04W 52/24* | (2009.01) |
| *H01Q 3/34* | (2006.01) |
| *H04B 1/04* | (2006.01) |
| *H04W 52/42* | (2009.01) |
| *H01Q 21/06* | (2006.01) |
| *H01Q 3/26* | (2006.01) |
| *H01Q 1/22* | (2006.01) |
| *H01Q 1/38* | (2006.01) |
| *H04W 4/80* | (2018.01) |

(52) U.S. Cl.
CPC ........ *H04W 52/243* (2013.01); *H01Q 1/2291* (2013.01); *H01Q 1/38* (2013.01); *H01Q 3/2623* (2013.01); *H01Q 3/34* (2013.01); *H01Q 21/065* (2013.01); *H04B 1/0475* (2013.01); *H04W 52/42* (2013.01); *H04W 4/80* (2018.02)

(58) Field of Classification Search
CPC .......... H04B 3/52; H04B 7/0617; H04B 7/04; H04B 7/0408; H04B 17/102; H01Q 21/061; H01Q 21/29; H01Q 25/007; H04W 4/80; H04W 16/28; H01P 1/00; G06F 3/0383; H03H 11/1208; H05K 1/0243; Y02D 70/144
USPC ................................................. 455/41.2, 25
See application file for complete search history.

(56) References Cited

U.S. PATENT DOCUMENTS

| | | | |
|---|---|---|---|
| 8,238,832 B1 | 8/2012 | Zhou | |
| 9,450,660 B1 | 9/2016 | Lee et al. | |
| 2013/0244594 A1* | 9/2013 | Alrabadi | H04B 7/0413 455/78 |
| 2015/0130539 A1* | 5/2015 | Gorbachov | H03F 1/565 330/260 |

* cited by examiner

*Primary Examiner* — Tu X Nguyen
(74) *Attorney, Agent, or Firm* — Brian Furrer

(57) ABSTRACT

A density-optimized short-range wireless communications antenna system has a first radiating element, a second radiating element, and a radio frequency transmitter that generates a radio frequency signal. A power divider has an input port connected to the radio frequency transmitter, a first output port, and a second output port connected to the second radiating element, and a signal power of the radio frequency signal is split between the first output port the second output port. A phase shifter is connected to the first output port of the power divider and to the first radiating element, with a phase of the first split radio frequency signal being shifted by a prescribed degree relative to the second split radio frequency signal.

19 Claims, 7 Drawing Sheets

DENSITY OPTIMIZED BLUETOOTH ANTENNA

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to radio frequency communications systems and antenna configurations therefor, as well as audio output device connectivity for in-flight entertainment systems. More particularly, the present disclosure relates to a density optimized Bluetooth antenna.

2. Related Art

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips the passenger has some idle time, which the traveler may occupy with work, leisure, and/or rest.

Airlines equip service aircraft with in-flight entertainment and communications (IFEC) systems, and a wide variety of content can be presented to the passenger therewith. Recently released movies are a popular viewing choice, as are television shows such as news programs, situation and stand-up comedies, documentaries, and so on. Useful information about the destination such as airport disembarking procedures, immigration and custom procedures and the like is also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games and other applications with which the passenger may interact.

Although the specific installation may vary depending on the service class, each passenger seat is equipped with a display device, an audio output modality, an input modality such as a remote control, and a terminal unit. Generally, the terminal unit includes a general-purpose data processor that can be programmed with instructions corresponding to one or more software applications that render/output the content, communicate with a central server to retrieve the content, and provide an interface for navigating through the vast content library to make selections for viewing and/or listening, among other functions.

The display device is typically an LCD screen that is installed on the seatback of the row in front of the passenger, though in some cases it may be mounted to a bulkhead or retractable arm or the like that is in turn mounted to the passenger's seat. The aircraft is equipped with a public announcement system that outputs audio through loudspeakers positioned throughout the cabin, and which may be heard by passengers without any personal audio equipment. However, such loudspeakers are appropriate only for essential aircraft-wide announcements, rather than individualized and independent playback of content that is possible with conventional IFEC systems. Accordingly, each display or seatback is equipped with a headphone jack, to which a headphone or an earphone, either supplied by the airline or by the passenger, may be connected. Dual mono sockets were utilized in older aircraft installations, though with more recent installations, a single 3.5 mm stereo plug adapter that accepts corresponding jacks of conventional consumer headphones and earphones may be utilized. The adapters may be connected to audio output sources and amplifiers integrated into the IFEC terminal unit. To the extent sound is generated in synchrony with the video display, the terminal unit is understood to incorporate various digital-to-analog circuitry and audio processors that convert the digital audio data to analog audio signals that are amplified and output to the stereo plug adapter.

Although wired connections to headphones and earphones are sufficiently adequate for connecting to audio sources, wireless audio devices are becoming increasingly popular. Commonly, these devices are implemented with short-range wireless data communications modalities like Bluetooth. In order to maximize the quality of Bluetooth audio link between the terminal unit and the headset, the radio frequency transmit signals have high output power. Conventional wireless audio systems installed in aircraft utilize antennas with high gain and efficiency, and typically have omnidirectional radiation patterns.

In the dense aircraft cabin environment, however, neighboring transmissions result in interference between passenger devices and monitors utilizing Bluetooth connectivity. Such interference is particularly problematic in the much denser lower cost cabin classes, as one Bluetooth link is likely to interference with all or many devices within a radius of ten feet. To the extent multiple passengers desire to use a Bluetooth headset, either to listen to content from the IFE terminal unit or their own Personal Electronic Devices (PEDs), within the same vicinity of each other.

Accordingly, there is a need in the art for an improved radio frequency communications system that avoids interference between multiple wireless transmissions in the same operating frequency range and the same communications protocol. There is also a need in the art for antennas that are installed in passenger aircraft cabins that focuses transmissions to one receiving node of a Bluetooth headset while minimizing interference with adjacent, and density-optimized antennas for Bluetooth.

BRIEF SUMMARY

Disclosed is a tuned multi-antenna array for a short-range wireless communication that minimizes interference among multiple receiving and transmitting devices in a confined space. Backlobe and sidelobe radiation of the antenna array is reduced or minimized, while focusing most of the transmission toward a target receiving device. Thus, other nearby devices may still achieve robust connections because of minimal radiated power beyond an intended area. Further, the output power of the transmit signal may be dynamically controlled on the fly to the minimum required to maintain the communications link in a fully operational state, but reducing interference to other nearby wireless connections in the same operating frequency band.

One embodiment of the disclosure is a density-optimized short-range wireless communications antenna system. There may be a first radiating element, a second radiating element, and a radio frequency transmitter generating a radio frequency signal. Additionally, there may be a power divider with an input port connected to the radio frequency transmitter, a first output port, and a second output port connected to the second radiating element. A signal power of the radio frequency signal may be split between the first output port the second output port. In particular, a first split radio frequency signal may be output from the first output port and a second split radio frequency signal may be output from the second output port. The antenna system may also include a phase shifter that is connected to the first output port of the power divider and to the first radiating element. A phase of the first split radio frequency signal may be shifted by a prescribed degree relative to the second split radio frequency signal.

Another embodiment of the disclosure is a short-range wireless communications antenna array. There may be a first antenna element defined by a first radiation pattern, and a second antenna element defined by a second radiation pattern. The first antenna element and the second antenna element may together define a directional array having a radiation pattern characterized by a main lobe oriented toward a receptor direction, one or more sidelobes, and a backlobe. This radiation pattern may be exhibited with the first antenna element being fed a first split of a radio frequency signal and the second antenna element being fed a second split of the radio frequency signal phase shifted from the first split of the radio frequency signal. Radio frequency signals from each of the first antenna element and the second antenna element may induce a destructive interference minimizing the sidelobes and backlobes in the radiation pattern of the directional array. Additionally, the same radio frequency signals from each of the first antenna element and the second antenna element may induce a constructive interference maximizing the main lobe in the radiation pattern of the directional array. Both may be based at least in part upon a tuning of a phase shift between the first split and the second split of the radio frequency signal.

Still another embodiment of the present disclosure is an antenna optimizer connectable to an antenna array including a first antenna and a second antenna. The antenna optimizer may include a power divider with an input port connected to a source of a radio frequency signal, a first output port, and a second output port connectable to the second antenna. A signal power of the radio frequency signal may be split between the first output port the second output port with a first split radio frequency signal being output from the first output port and a second split radio frequency signal being output from the second output port. The antenna optimizer may also have a phase shifter connected to the first output port of the power divider and connectable to the first antenna. A phase of the first split radio frequency signal may be shifted by a prescribed degree relative to the second split radio frequency signal. Further, a combined radiation pattern of the antenna array with the first split radio frequency signal being radiated from the first antenna and the second split radio frequency signal being radiated from the second antenna may define an antenna array directivity gain toward a receptor direction.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure contemplates wireless communications systems for use in high-density environments such as aircraft and other passenger vehicles with short-range radio frequency connectivity between personal electronic devices (PEDs) and on-board entertainment systems. The detailed description set forth below in connection with the appended drawings is intended as a description of the presently preferred embodiments of such systems, and is not intended to represent the only form in which it can be developed or utilized. The description sets forth the features in connection with the illustrated embodiments. It is to be understood, however, that the same or equivalent functions may be accomplished by different embodiments that are also intended to be encompassed with the present disclosure. It is further understood that the use of relational terms such as first, second, and the like are used solely to distinguish one from another entity without necessarily requiring or implying any actual such order or relationship between such entities.

Figure 1:
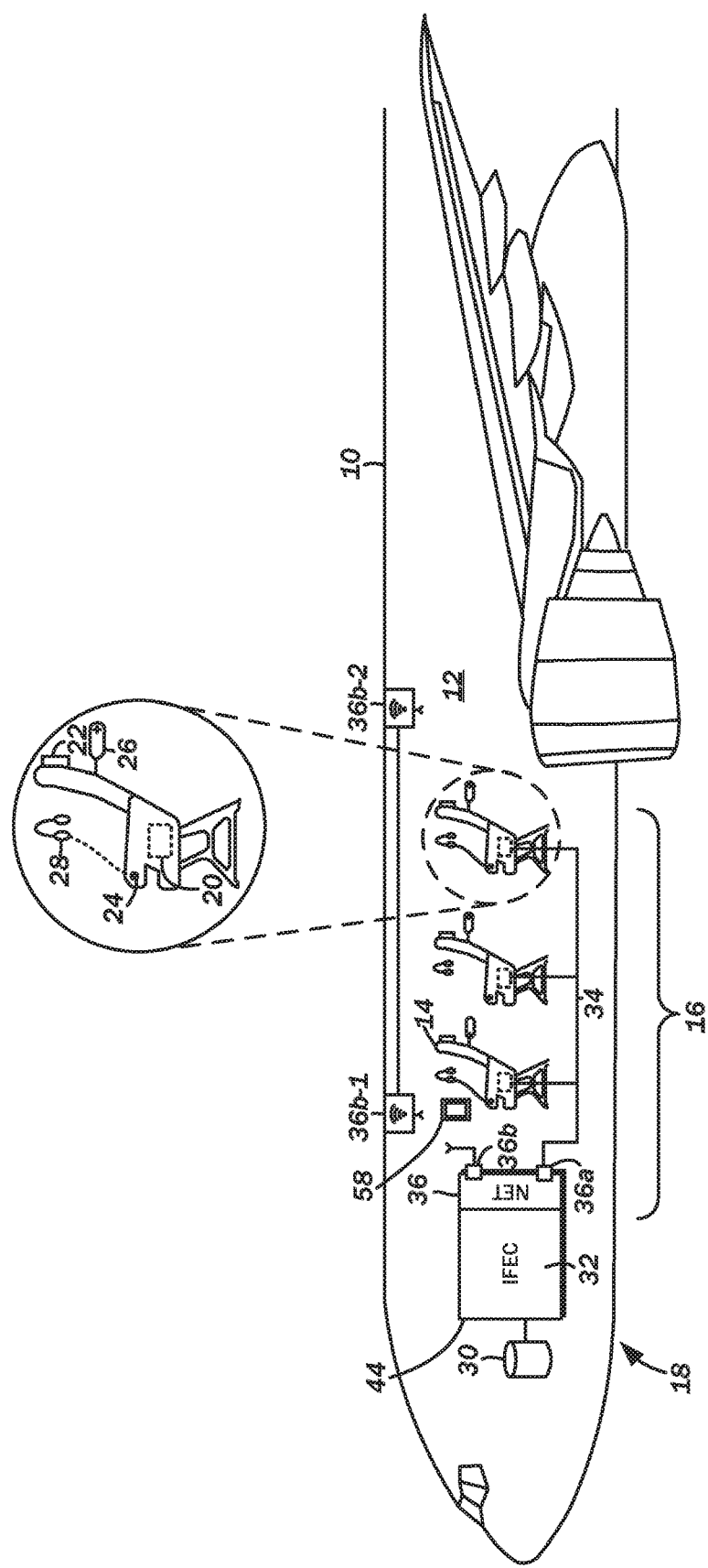
FIG. 1 is a diagram of an exemplary aircraft environment in which one aspect of the presently disclosed wireless connectivity system may be utilized.

The diagram of FIG. 1 depicts an exemplary aircraft 10 in which various embodiments of the presently disclosed density optimized antenna may be implemented. Within a fuselage 12 of the aircraft 10 there are seats 14 arranged over multiple rows 16, with each seat 14 accommodating a single passenger. Although the features of the present disclosure will be described in the context of the passenger aircraft 10 and amenities therefor, other passenger vehicles such as trains, watercraft, buses, and others utilizing integrated entertainment systems may be substituted.

The aircraft 10 incorporates an in-flight entertainment and communications (IFEC) system 18, through which various entertainment and connectivity services may be provided to passengers while onboard. A typical IFEC system 18 includes individual seat-back modules comprised of a terminal unit 20, a display device 22, an audio output device 24, and a remote controller 26. For a given row 16 of seats 14, the terminal unit 20 and the audio output device 24 may be disposed on the seat 14 for which it is provided, but the display device 22 and the remote controller 26 may be disposed on the row 16 in front of the seat 14 to which it is provided. That is, the display device 22 and the remote controller 26 are installed on the seatback of the row in front of the seat. This is by way of example only, and other display device 22 and remote controller 26 mounting and access configurations such as a retractable arm or the like mounted to an armrest of the seat 14 or by mounting on a bulkhead.

The arrangement of the IFEC system 18, along with its constituent components described herein are being presented by way of example only and not of limitation. Those having ordinary skill in the art will recognize that the IFEC system 18 and its functional subparts can be arranged and organized in any number of different configurations. Furthermore, there may be additional components not mentioned herein, and certain functions may be handled by a different subpart or component than that to which the present disclosure attributes.

In additional detail, the display device 22 is understood to be a conventional liquid crystal display (LCD) screen with a low profile that is suitable for installation on the seatback. Each passenger can utilize an individual headset 28, supplied by either the airline or by the passenger, which provides a more private listening experience. In one embodiment, the audio output device 24 is a headset jack that is a standard ring/tip/sleeve socket. The headset jack may be disposed in proximity to the display device 22 or on the armrest of the seat 14 as shown. The headset jack may be an active type with noise canceling and including three sockets or a standard audio output without noise canceling.

Each display device 22 may incorporate a terminal unit 20 to form a functional unit referred to in the art as a smart monitor. Such a smart monitor, as well as any combination of hardware and software components that work together to present content to individual passengers, may also be referred to herein as a display monitor.

Figure 2:
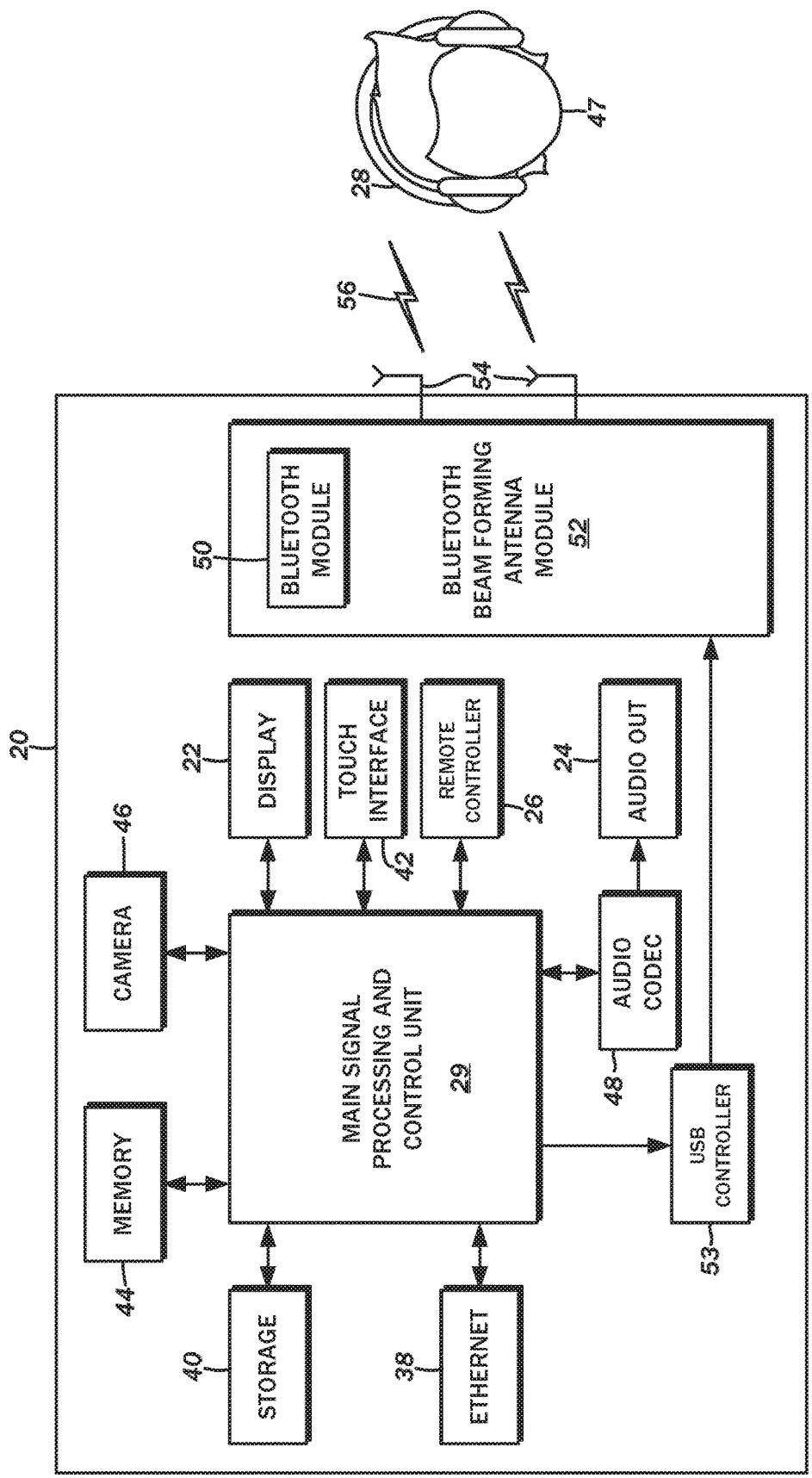
FIG. 2 is a block diagram showing the components of an in-flight entertainment and communications (IFEC) system terminal unit.

A common use for the terminal unit 20 installed on the aircraft is the playback of various content. With reference to the block diagram of FIG. 2, the terminal unit 20 may be implemented with a general-purpose data processor 29 that decodes the data files corresponding to the media content and generates video and audio signals for the display device 22 and the audio output device 24, respectively. This content may include movies, television shows, such as news programs, comedy, documentaries, and informational content pertinent to the flight destination. Furthermore, content may also encompass audio-only programming, as well as interactive games, flight progress mapping, flight status displays, newspapers/magazines readable on the display device 22, and so on. Broadly, content is intended to refer to any content of varying duration and form that can be presented to the passenger via the display device 22 or the audio output device 24, or a combination thereof.

Referring back to FIG. 1, the data files of the content may be stored in a database 30 associated with the IFEC system 18. Specifically, the database 30 is connected to and managed by an IFEC server 32, which may be a specifically adapted general purpose computer system configured as a server to provide data in response to requests therefor. Various software modules are understood to be incorporated into the IFEC server 32, including a streaming server that retrieves the multimedia content from the database 30.

Each of the terminal units 20 may, in turn, be connected to the IFEC server 32 over an aircraft local area network 34, one segment of which may preferably be Ethernet. Thus, the IFEC server 32 includes a data communications module 36, and more specifically, an Ethernet data communications module 36a, e.g., an Ethernet switch or router. As shown in the block diagram of FIG. 2, the terminal unit 20 likewise includes an Ethernet module 38 that is controlled by the data processor 29. The Ethernet module 38 is understood to establish the physical and logical layers of the data communications link to the Ethernet data communications module 36a of the IFEC server 32. Although some embodiments may implement a configuration in which the content is directly streamed from the IFEC server 32, it is also possible to temporarily load the content to a storage device 40 incorporated into the terminal unit 20.

The passenger can play games being executed on the terminal unit and otherwise interact with the multimedia content with the aforementioned remote controller 26. Navigating through the vast multimedia content library and selecting ones for viewing and/or listening is also possible with the remote controller 26, though in some embodiments, a touch-screen interface 42 may be provided for a more intuitive interaction with the multimedia content library. In either case, the terminal unit 20 is loaded with a content selection software application that is executed by the data processor 29 and accepts input from the remote controller 26, the touch-screen interface 42, or other input modality and generates a response on the graphical interface presented on the display device 22. These applications are understood to be loaded into an onboard memory 44 per conventional practice, and the instructions constituting such applications are retrieved from the memory 44 by the data processor 29 for execution. Data incidental to such applications may also be stored in the memory 44.

The terminal unit 20 may also include a camera 46 or digital imaging sensor that is capable of capturing images of the user or the environment to further adjust the execution of various software applications. For example, the camera 46 may also serve as a gesture input modality for manipulating or interacting with the graphical user interface being shown on the display device 22. Additionally, a mood of the passenger may be captured to modify color schemes, suggest specific programming depending on the mood, and the like. In general, the camera 46 is understood to be yet another device from which the data processor 29 captures external inputs that modify the operation of the terminal unit 20 in some way.

Again, a user/passenger 47 of the smart monitor/terminal unit 20 may listen to audio content with the headset 28, which may be over-the-head headphones, earbuds, or any other type of personal acoustic transducer device. As briefly mentioned above, one modality for connecting the headset 28 with the terminal unit 20 is via a wired connection, with the headset 28 including cables terminated with a 3.5 mm or other standard-sized jack that is pluggable into a corresponding socket mounted to a structure to which wires can be routed to the terminal unit 20, such as a seatback or an armrest. With reference again to the block diagram of FIG. 2, the hardware of the socket, along with the digital-to-audio converter that transforms digital audio data to an analog waveform reproducible as sound by the headset 28, and any related amplifier circuitry, is understood to be encompassed within the audio output device 24. The audio data may be encoded according to one of many known formats (such as MP3, AAC, and the like), and so the data processor 29 may pass such encoded audio data to a codec 48. In this regard, the codec 48 is understood to be the precursor step to converting a stream of data representative of an analog audio signal to the analog audio signal itself.

The headset 28 may also be connected wirelessly to the terminal unit 20. One example of a conventional wireless audio modality is Bluetooth, which transmits data over a radio frequency transmission link in the Industrial-Scientific-Medical (ISM) frequency band of 2.4 GHz to 2.45 GHz. The headset 28 is understood to include a Bluetooth receiver, while the terminal unit 20 incorporates a Bluetooth transmitter that is part of a Bluetooth module 50. The audio data that would otherwise be converted to an analog audio signal for output via the headset jack may be passed to the Bluetooth transmitter, and one or more antennas 54 may radiate a radio frequency signal that is received by the receiver of the headset 28. A persistent data communications link 56 may thus be established between the headset 28 and the terminal unit 20. The transferred data may be decoded and converted to an analog audio signal at the headset 28 end. As will be described more fully below, in addition to the possibility of additional terminal units 20 also wirelessly connecting to headsets 28 of nearby passengers, other devices may be operating within the same ISM band. The present disclosure contemplates apparatuses and systems for minimizing the potential for interference among multiple Bluetooth-connected headsets 28 and these other devices, one implementation of which may be a Bluetooth beam-forming antenna module 52. Although various embodiments are described in the context of a Bluetooth implementation, it will be appreciated by those having ordinary skill in the art that any other wireless communications modality may be substituted, including, but not limited to, WiFi, and the various technology generations thereof.

While the data processor 29 may communicate with the components of the terminal unit 20 via the system bus (Peripheral Component Interconnect, or PCI, etc.) in the illustrated embodiment, the Bluetooth module 50 and the Bluetooth beam-forming antenna module 52 may be connected via a secondary Universal Serial Bus (USB) interfaces. Thus, the terminal unit 20 may include a USB host controller 53 to which the Bluetooth module 50 and the Bluetooth beam-forming antenna module 52 connect.

Returning to FIG. 1, one or more passengers may utilize a personal electronic device (PED) 58 during flight. Passenger PEDs 58 may refer to smart phones, tablet computers, laptop computers, and other like devices that include a general purpose data processor that executes pre-programmed instructions to generate various outputs on a display, with inputs controlling the execution of the instructions. Additionally, PEDs 58 may include other connected devices such as the aforementioned wireless headphones, as well as smart watches, activity monitors, and the like. Although these devices are most often brought on board the aircraft 10 by the passengers themselves, carriers may also offer them to the passengers for temporary use.

Many conventional PEDs 58 have a WLAN (Wi-Fi) module as a primary connectivity modality. In order to provide onboard connectivity, the data communications module 36 of the IFEC server 32 also includes a WLAN access point 36b. The PEDs 58, via the onboard WLAN network, may connect to the IFEC server 32 to access various services offered thereon such as content downloading/viewing, shopping, and so forth. PEDs 58 are also understood to include Bluetooth modules like the aforementioned headset 28, and can establish Bluetooth communications links with the smart monitor. In this regard, although the present disclosure makes reference to the mitigation of interference among multiple headsets 28, it is understood that this refers to any other device communicating wirelessly over a Bluetooth or other link.

Typically, a single WLAN access point 36b is insufficient for providing wireless connectivity throughout the cabin, so additional WLAN access points 36b-1 and 36b-2 may be installed at various locations spaced apart from each other. These additional WLAN access points 36b-1 and 36b-2 may be connected to the IFEC server 32 over an Ethernet link that is part of the aforementioned aircraft local area network 34. The local area network interface or data communications module 36 is understood to encompass the hardware components such as the WLAN access point 36b/transceiver and the Ethernet router/switch 36a, as well as the software drivers that interface the hardware components to the other software modules of the IFEC server 32.

Figure 3:
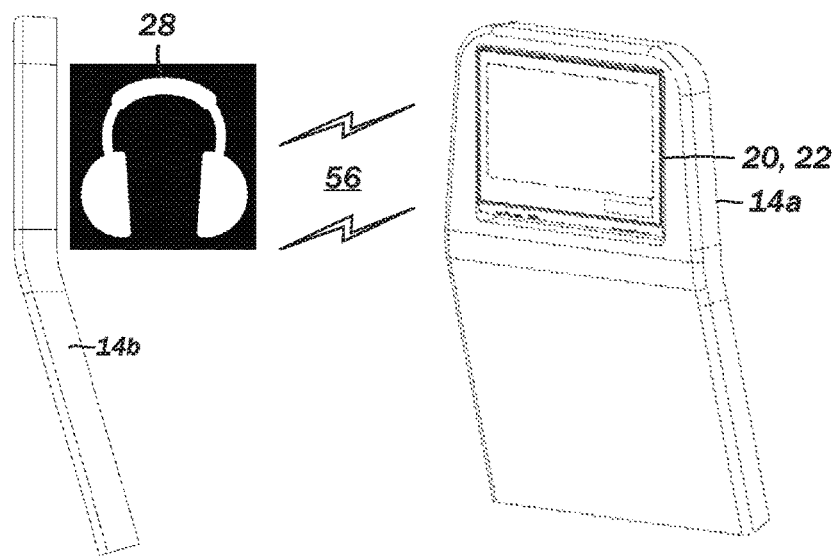
FIG. 3 illustrates an example passenger seat arrangement with a seatback incorporating a display and wireless audio transmission modalities for a passenger seated in a row behind.

These additional wireless devices operating on the ISM band may interfere with the data communications link 56 between the headset 28 and the terminal unit 20. In the typical seating configuration of passenger vehicles shown in FIG. 3, there may be a first seat 14a, and immediately behind it, a second seat 14b. On the seatback of the first seat 14a is the display device 22, which in the illustrated example, is a smart monitor that also incorporates the terminal unit 20. This smart monitor is rear-facing and thus configured for use by a passenger seated at the second seat 14b. As discussed above, the terminal unit 20 includes a short range wireless communications modality, e.g., the Bluetooth module 50 that establishes the Bluetooth audio data communications link 56 with the passenger headset 28. This wireless communications module may also be installed on the seat back, or any other suitable location.

Figure 4:
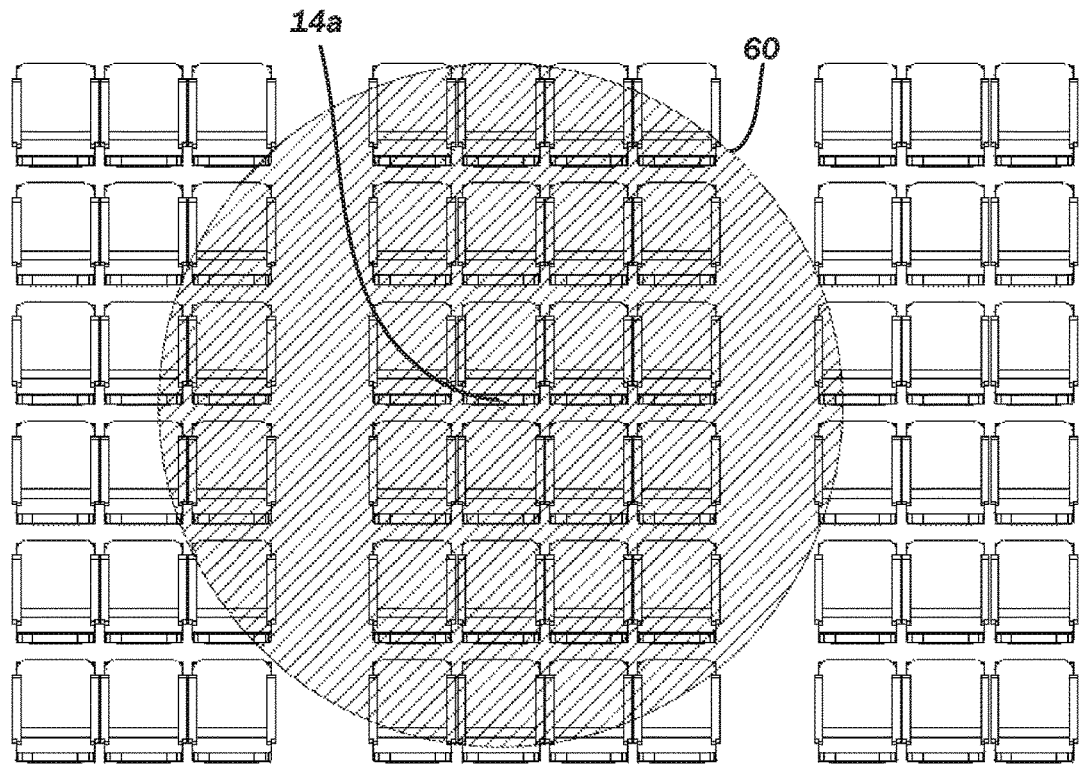
FIG. 4 depicts a multi-row, passenger seating configuration in an aircraft, with a simulated propagation of a conventional omnidirectional antenna used in short-range wireless communications.

FIG. 4 is a top plan view of a typical seating arrangement in a passenger vehicle. Again, a first seat 14a incorporates a Bluetooth transmitter that radiates a signal for establishing the data communications link 56 with the headset 28 or other PED 58. Conventional Bluetooth transmitters typically employ antennas that exhibit an omnidirectional radiation pattern 60 that has the potential to interfere with other devices within its radiating path. As discussed above, the range for a Bluetooth signal may extend up to ten feet, which would encompass adjacent seats as well as several more beyond in all directions. Presently, although Bluetooth headsets 28 are seeing widespread adoption, it has not yet reached near-ubiquitous use, particularly on aircraft. Interference among Bluetooth headsets 28 and other PEDs is becoming increasingly problematic, so the present disclosure contemplates the minimization thereof with other Bluetooth users in seats in the proximity of the transmitting antenna.

Figure 5:
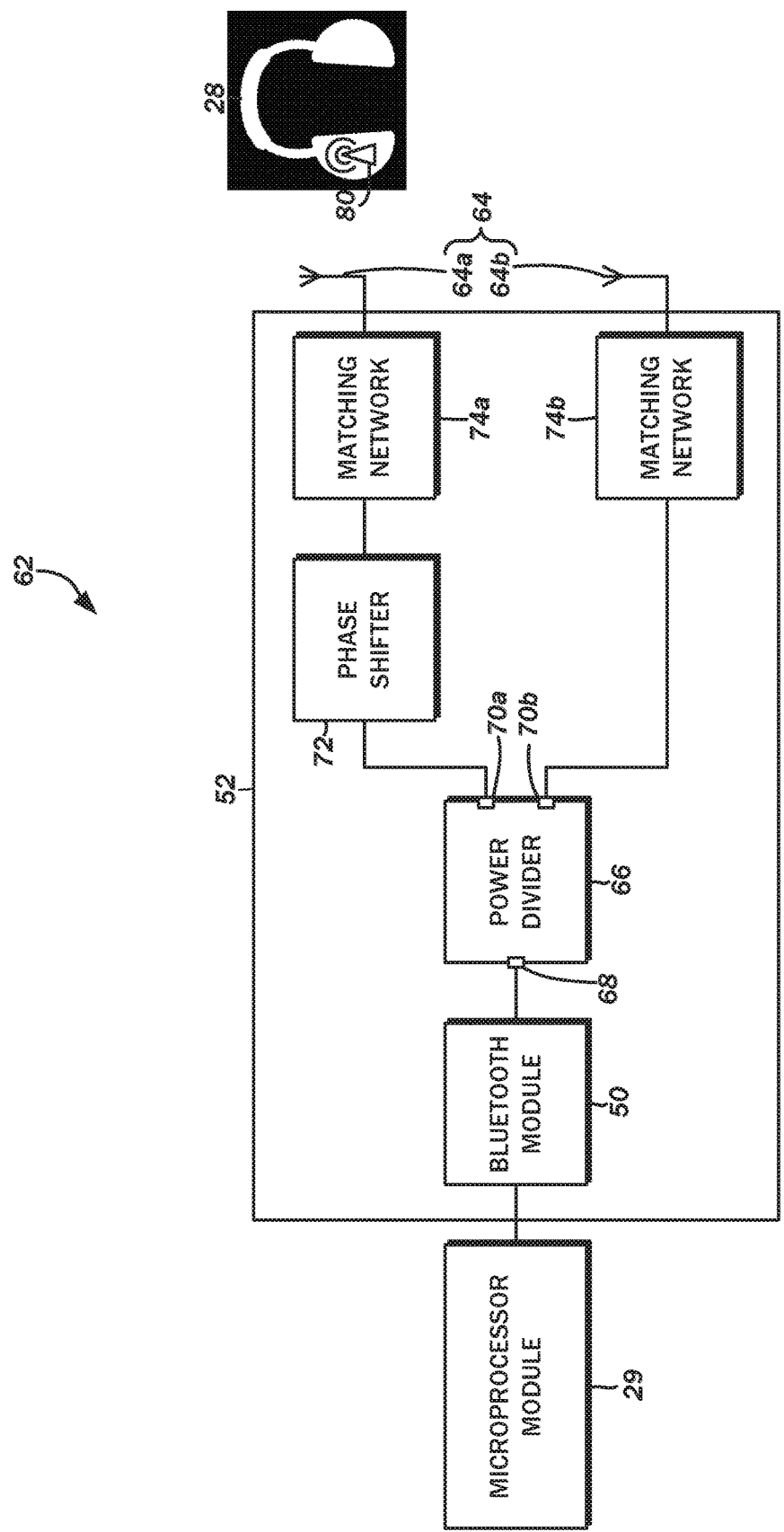
FIG. 5 is a block diagram of an exemplary embodiment of a density-optimized short-range wireless communications antenna system.

With reference to the block diagram of FIG. 5, additional details of a density-optimized short-range wireless communications antenna system 62 that is contemplated to minimize radiated power outside of the intended passenger seat area will now be described. In one embodiment, the antenna system 62 includes the aforementioned beam-forming antenna module 52 that is connected to the data processor 29, here labeled as a microprocessor module. The data processor 29 is understood to output the data that is to be transmitted to the receiver of the headset 28 or other PED 58, as well as control certain aspects of its operation. The beam-forming antenna module 52 may also be referred to as an antenna optimizer in accordance with alternative embodiments, and is connectable to an antenna array 64 including a first antenna 64a or radiating element and a second antenna 64b or radiating element.

The beam-forming antenna module 52 includes the Bluetooth module 50, which is generally comprised of a baseband processor, a radio frequency transceiver, and one or more amplifier circuits and filter circuits (both baseband and carrier). As will be readily recognized by those having ordinary skill in the art, the baseband processor accepts inputs of data as provided through the USB interface to the USB host controller 53, and generates a packet or a sequence of data according to a predefined format, with each segment of the sequence of data corresponding to a specific field that is recognized by the receiving Bluetooth module. Although described in greatly simplified terms, Bluetooth is understood to implement various modulation techniques such as Gaussian frequency-shift keying, differential quadrature phase shift keying, and so forth to transmit the baseband signal on multiple radio frequency carrier signal channels, the details of which will be omitted. One implementation contemplates the use of the BT800 Bluetooth module from Laird PLC of Chesterfield, Mo., USA, though any other suitable Bluetooth module 50 may be readily substituted.

The Bluetooth radio frequency signal output from the Bluetooth module 50 is passed to a power divider 66, and specifically to an input port 68 thereof. The power of the radio frequency signal is split between a first output port 70a and a second output port 70b. The signal from the first output port 70a may be referenced as the first split radio frequency signal, while the signal from the second output port 70b may be referenced as the second split radio frequency signal. One implementation may utilize the SKY16406-381LF two-way power splitter/combiner from Skyworks Solutions, Inc., though any other suitable power splitter circuit may be substituted. Along these lines, the principles of operation of the power divider 66 are well known in the art, and so the details thereof will be omitted.

The first output port 70a of the power divider 66 is connected to a phase shifter 72, with the output thereof being connected to the first antenna 64a. Along these lines, the second output port 70b of the power divider 66 may be connected to the second antenna 64b. It is noted that the phase shifter 72 is described as being connected to the first antenna 64a, and the second output port 70b is described as being connected to the second antenna 64b, even though there are matching networks 74a, 74b interposed in the signal path before the respective antennas 64a, 64b. As will be appreciated by those having ordinary skill in the art, the matching networks 74 are utilized for impedance matching the respective outputs of the phase shifter 72 and the power divider 66 to the antennas 64a, 64b so that power transfer/transmission efficiency can be maximized. Furthermore, the matching networks 74 may be implemented within basic passive components including resistors and inductors, and is understood to minimally affect the radio frequency signals passing through the same, at least with respect to amplification/attenuation and phase. Thus, for the sake of simplicity, and notwithstanding the inclusion of these matching networks 74 along the signal path as a usually necessary component between a radio frequency signal source and an radiator, it is intended to be understood that the output of the phase shifter 72 is connected to the first antenna 64a, and the second output port 70b of the power divider 66 is connected to the second antenna 64b. Along these lines, while a basic embodiment may not show any additional filter or amplification circuits, it is deemed to be within the purview of one having ordinary skill in the art to include such additional components, all the while being encompassed by a description that the phase shifter 72 is connected to the first antenna 64a and the power divider 66 is connected to the second antenna 64b.

The phase shifter 72, as suggested by its name, shifts the phase of the first split radio frequency signal from the first output port 70a of the power divider 66 relative to the second split radio frequency signal from the second output port 70b. The phase shift is by a prescribed degree, and is tuned to achieve an increased directivity of the antenna array 64. One implementation contemplates the use of the LPF152G5E030F127 phase shifter for Bluetooth/WiFi/Zigbee from Murata Manufacturing Co., Ltd, but again, any other suitable phase shifter may be substituted.

Figure 6:
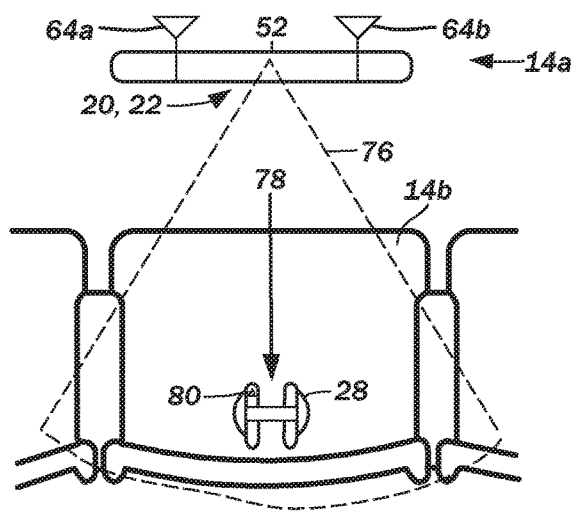
FIG. 6 illustrates one exemplary combined radiation pattern of an antenna array of the density-optimized short-range wireless communications antenna system in a passenger vehicle seatback installation.

The first antenna 64a is understood to have a particular radiation pattern, and the second antenna 64b is likewise understood to have a particular radiation pattern. Referring to the illustration of FIG. 6, in general terms, a combined radiation pattern 76 of the first antenna 64a and the second antenna 64b with the first split (and phase-shifted) radio frequency signal being radiated from the first antenna 64a and the second split radio frequency signal being radiated from the second antenna 64b defines an antenna array directivity gain toward a receptor direction 78, e.g., the direction of the passenger and a receiving antenna 80 of the headset 28 being used thereby. In other words, the phase-shifted signal radiated from the first antenna 64a induces a destructive interference of the non-shifted signal radiated from the second antenna 64b and vice versa in certain directions away from a receptor direction, as well as a constructive interference toward the receptor direction 78. The extent of the destructive interference may be a function of the prescribed degree of phase shift between the first split radio frequency signal and the second split radio frequency signal.

Figure 7:
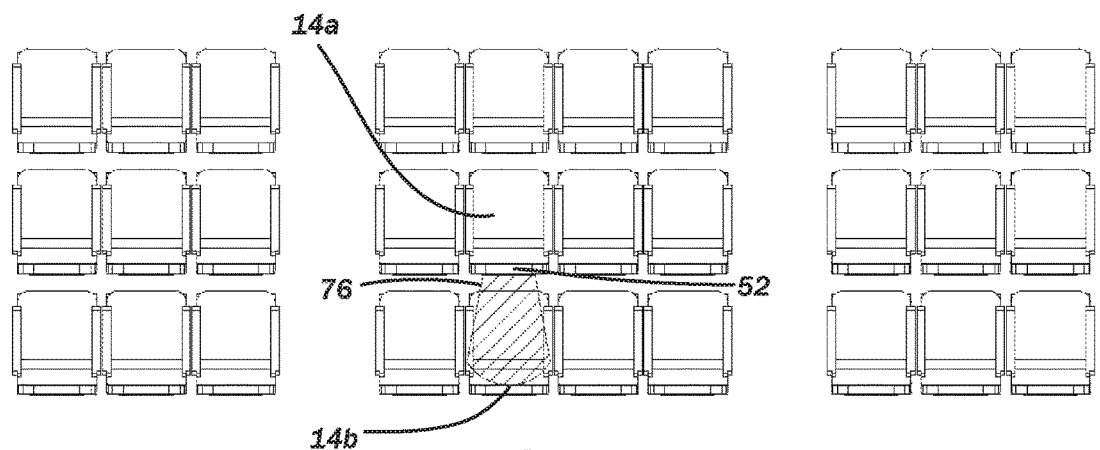
FIG. 7 illustrates the limited combined radiation pattern of the density-optimized short-range wireless communications antenna system within a compacted environment of the passenger vehicle.
Figure 8:
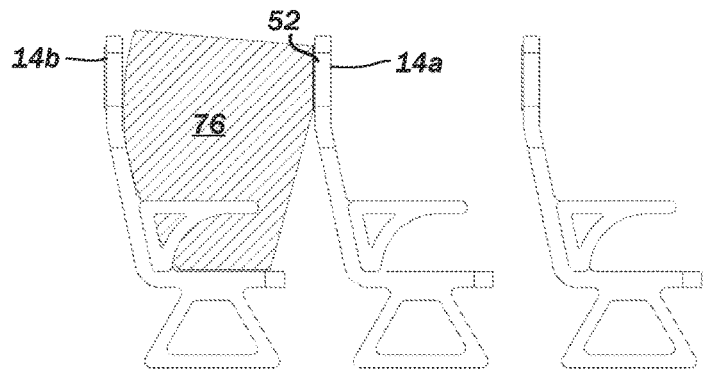
FIG. 8 is a side view illustrating the limited combined radiation pattern of the density-optimized short-range wireless communications antenna system.

With additional reference to FIGS. 7 and 8, the combined radiation pattern 76 from the beam-forming antenna module 52 is contemplated to be limited to the areas that would be occupied by the passenger using the smart terminal, and immediately in front of the beam-forming antenna module 52. FIG. 7 specifically illustrates the lateral extent of the combined radiation pattern 76, and FIG. 8 specifically illustrates the vertical extent of the combined radiation pattern 76. Advantages of the radiation pattern 76 include reduced interference. Moreover, overlapping signals can make it difficult for a passenger to select the correct monitor with which to establish a data link, also known as pairing. The radiation pattern 76 reduces overlapping signals from neighboring monitors, which makes it easier for a passenger to select the correct monitor with which to pair.

Figure 9:
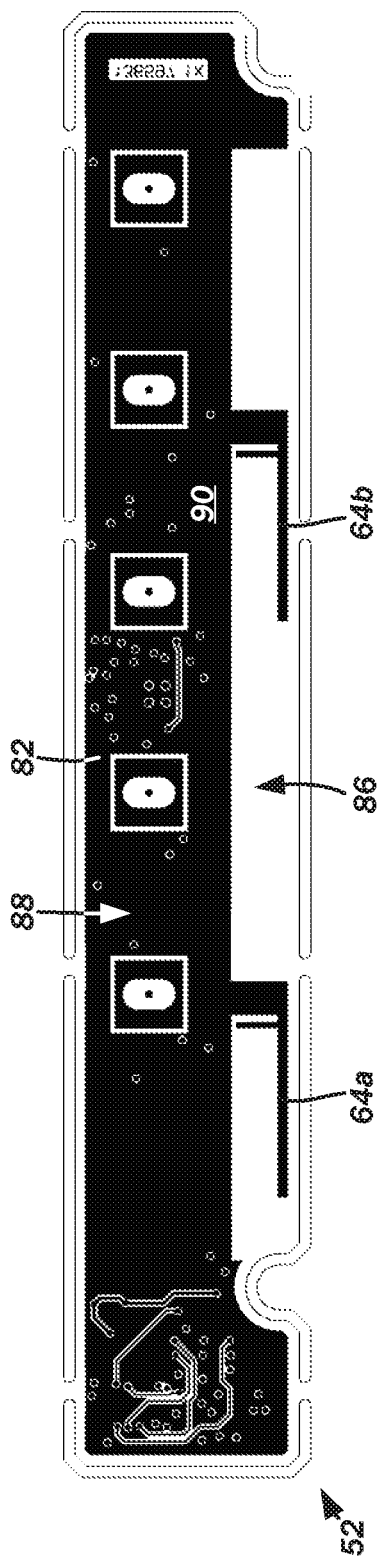
FIG. 9 is a top plan view of a printed circuit board-based implementation of the density optimized short-range wireless communications antenna system, including the antenna array embodied as electrical traces on the printed circuit board.

As best illustrated in the top plan view of an exemplary embodiment of the beam-forming antenna module 52 shown in FIG. 9, the first and second antennas 64a, 64b may be implemented as planar inverted-F antennas (PIFA). Further, in this embodiment, and has been described above, the antenna array 64 is comprised of two antennas, but this is by way of example only and not of limitation, and additional antennas may be added. Portions of the circuitry of the beam-forming antenna module 52 may be implemented on a printed circuit board 82 with a substrate and one or more electrically conductive traces. The integrated circuits of the Bluetooth module 50, the discrete packaged components of the power divider 66 and the phase shifter 72, as well as the discrete passive components of the matching networks 74 may be mounted to the printed circuit board 82. The radiating elements of the antennas 64*a*, 64*b*, in turn, may be fabricated with the conductive traces of the printed circuit board 82 in a first section 86 thereof. A second section 88 of the printed circuit board 82 is understood to define a ground plane 90.

Figure 10:
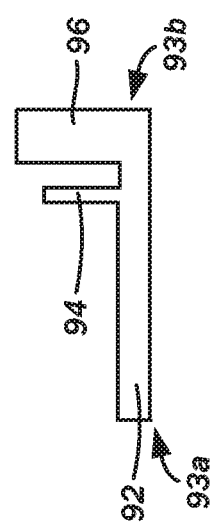
FIG. 10 is a top plan view of a planar inverted-F antenna utilized in one or more embodiments of the density optimized short-range wireless communications antenna system of the present disclosure.

With reference to FIG. 10, the planar inverted-F antenna 64*a*, 64*b* is defined by a monopole 92 that serves as the primary radiating element, which in turn is fed by a feed pin 94. Additionally, there is a shorting pin 96 that connects the monopole 92 to the ground plane 90. The monopole 92 is defined by a first end 93*a* and opposed second end 93*b*. The shorting pin 96 is disposed toward the second end 93*b*, with the feed pin 94 being in close proximity thereto and likewise disposed toward the second end 93*b*. It will be recognized by those having ordinary skill in the art that the various dimensions of the monopole 92, the feed pin 94, the ground plane 90, and the relative positioning thereof define the radiating characteristics of the antenna. These parameters may be variously adjusted to tune the antenna to the desired performance.

It is understood that the radiation directivity of the combined antenna array 64 is dependent upon the phase difference between the individual radiating elements or antennas 64*a*, 64*b* and their geometric configurations. As referenced herein, directivity is understood to be the ratio of the radiation intensity in a given direction from the antenna to the radiation intensity averaged over all directions. The average radiation intensity is equal to the total power radiated by the antenna divided by $4\pi$. The antenna array 64 increases radiation intensity in a desired direction and reduces radiation intensity relative to other directions. Spacing between the radiating elements 64*a*, 64*b* may also be modified to alter the array performance, and change the radiation directivity. Alternative antenna configurations may be substituted, as long as the phase shifting parameters are accordingly modified. As indicated above, additional radiating elements may be added to the antenna array 64, and based upon experimental setups, increased directivity has been observed.

Figures 11A, 11B:
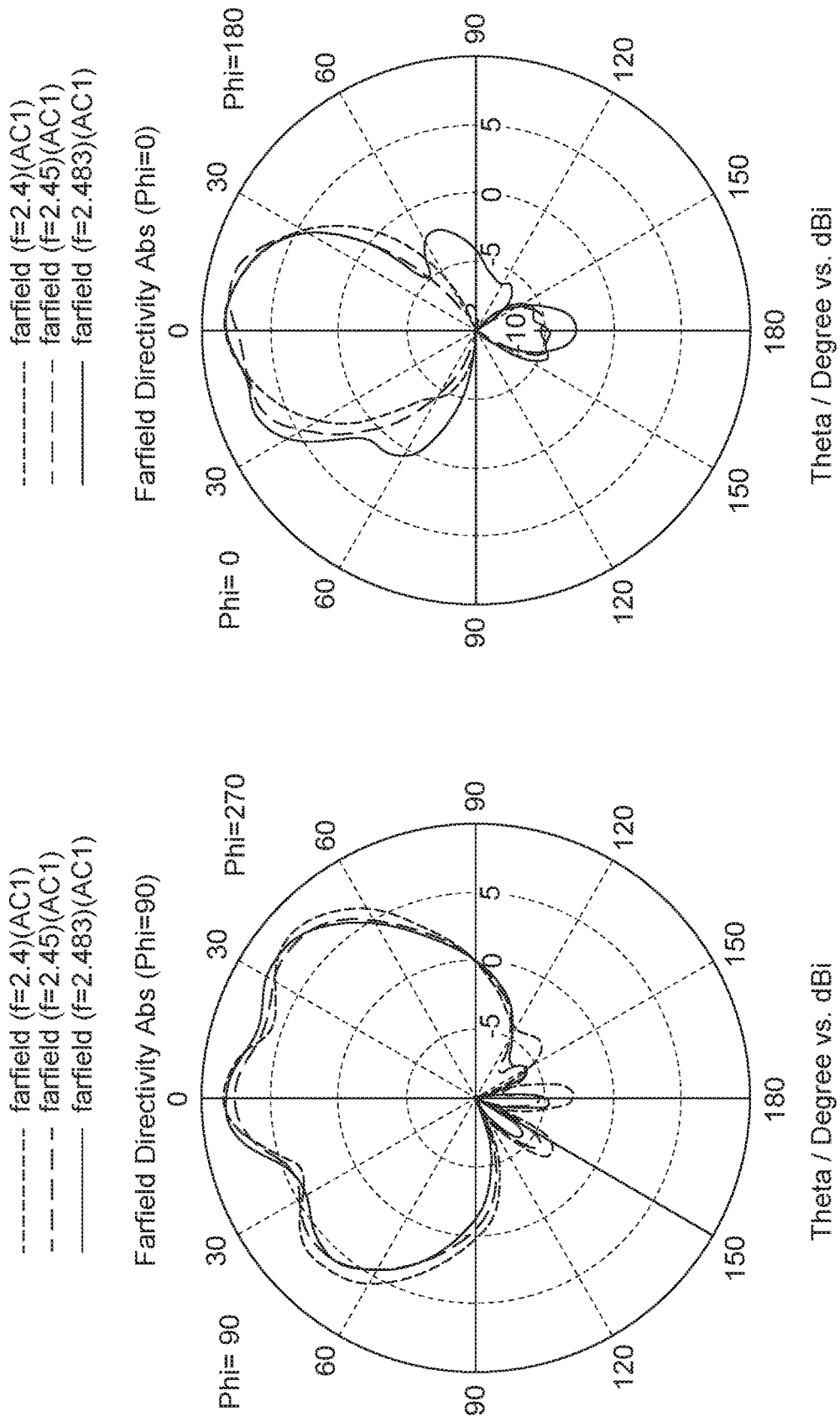
FIGS. 11A and 11B plot the elevation pattern and the azimuthal pattern, respectively, of the antenna array when operating in conjunction with a beam-forming antenna module.

FIGS. 11A and 11B are graphs illustrating the elevation pattern and the azimuthal pattern, respectively, of the antenna array 64 when operating in conjunction with the beam-forming antenna module 52 as described above. The antenna array 64 defines a radiation pattern characterized by a main lobe oriented toward the receptor direction, as well as a one or more miniscule sidelobes and a backlobe. Again, this radiation pattern is understood to be possible with the first radiating element or antenna 64*a* being fed the first split of the radio frequency signal, and the second radiating element or antenna 64*b* being fed the second split of the radio frequency signal phase shifted from the first split of the radio frequency signal. These signals are envisioned to induce a destructive interference that minimizes the sidelobes and backlobes in the radiation pattern of the directional array, and a constructive interference that maximizes the main lobe, and are based at least in part upon a tuning of the phase shift between the first split and the second split of the radio frequency signal.

The Bluetooth beam-forming antenna module 52 is contemplated to achieve a high level of directivity toward the user 47 and the devices associated therewith, including the headset 28 and the PEDs 58. The features described above alone may be sufficient to minimize interference to other nearby wireless devices, though the present disclosure envisions another modality by which the possibility of such interference is further reduced. In further detail, the output power of the radio frequency transmitter may be tunable in response to interference to neighboring radio frequency devices. More particularly, the output power is reduced to the minimum level at which a data communications link between the smart monitor and the headset 28 or other PED 58 can still be maintained.

While pairing the Bluetooth receiver on, for example, the headset 28, and the transmitter on the smart monitor, the power level may be reduced to the lowest transmitted power level consistent with a reliable link. The level by which the transmit power is reduced may be varied according to the specifics of the seating arrangement in the aircraft 10. For example, in premium seating classes where the spacing between each seat is greater, the transmit power may be reduced by a lesser extent. However, in non-premium seating classes with a closer spacing between each seat, the transmit power may be reduced by a greater extent. Specifically, the output power of each smart monitor transmitter may be controlled and adjusted based on distance between the smart monitor transmitter and the passenger seat corresponding thereto. In addition, the transmit power from the smart monitor may be controlled based upon a received signal strength indicator (RSSI) reading. If the RSSI reading falls below a threshold level, the output power of the transmitter may be increased to bring the RSSI reading above that threshold level. As a further dynamic control to minimize the output power level of the transmitter, diverging from this normal mode of operation, the transmit power level is not increased in an attempt to raise the RSSI reading; rather, it is assumed that such devices reporting a lower RSSI reading are further away, and instead attempts to locate a device that reports a higher RSSI reading.

By limiting the transmit power level, there is understood to be a correspondingly reduced visibility for the area in which the receiving device is to be searched. It will be understood by those having ordinary skill in the art that the RSSI reading is arbitrary and is used to provide an indication of when the signal level, and thus the transmitted power level needs to be increased or decreased. The output power level of the transmitter in the Bluetooth module 50 may be maintained at a point matching the minimum requirement for a receive sensitivity of −70 dBm. This receive sensitivity level, in turn, corresponds to specific distances at specific power levels, and thus limit the area in which receiving devices are discoverable.

The particulars shown herein are by way of example only for purposes of illustrative discussion, and are presented in the cause of providing what is believed to be the most useful and readily understood description of the principles and conceptual aspects of the various embodiments of the density-optimized short range wireless communications antenna system. In this regard, no attempt is made to show any more detail than is necessary for a fundamental understanding of the different features of the various embodiments, the description taken with the drawings making apparent to those skilled in the art how these may be implemented in practice.

What is claimed is:

1. A density-optimized short-range wireless communications antenna system for transmitting to one or more receiving portable electronic devices within a single area occupied by a passenger, the system comprising:
   a first radiating element having a corresponding radiation pattern;
   a second radiating element having a corresponding radiation pattern;
   a radio frequency transmitter generating a radio frequency signal;
   a power divider with an input port connected to the radio frequency transmitter, a first output port, and a second output port connected to the second radiating element, a signal power of the radio frequency signal being split between the first output port the second output port with a first split radio frequency signal being output from the first output port and a second split radio frequency signal being output from the second output port; and
   a phase shifter connected to the first output port of the power divider and to the first radiating element, a phase of the first split radio frequency signal being shifted by a prescribed degree relative to the second split radio frequency signal,
   wherein a combination of the radiation patterns of the first radiating element and the second radiating element defining an antenna array directivity gain toward a receptor direction within the single area occupied by the passenger without interference to adjacent areas for personal electronic devices of other passengers.

2. The antenna system of claim 1, wherein one of the first or second split radio frequency signals radiated from the corresponding first or second radiating element destructively interferes with the other one of the first or second split radio frequency signal radiated from the corresponding one of the first or second radiating element at directions of the radiation patterns offset from the receptor direction.

3. The antenna system of claim 2, wherein the destructive interference between the first and second split radio frequency signals as radiated from the respective first and second radiating elements is a function of the prescribed degree of phase shift between the first and second split radio frequency signals.

4. The antenna system of claim 1, wherein output power of the radio frequency transmitter is tunable in response to interference to neighboring radio frequency devices.

5. The antenna system of claim 1, further comprising:
   a first matching network connected to the phase shifter and the first radiating element; and
   a second matching network connected to the second output of the power divider and the second radiating element.

6. The antenna system of claim 1, wherein the first radiating element is a first conductive trace disposed on a printed circuit board, and the second radiating element is a second conductive trace disposed on the printed circuit board and spaced apart from the first conductive trace.

7. The antenna system of claim 1, wherein the first radiating element and the second radiating element are a planar inverted F antenna.

8. The antenna system of claim 1, wherein the radio frequency signal is a Bluetooth signal.

9. A short-range wireless communications antenna array for transmitting to one or more receiving personal electronic devices within a single area occupied by a passenger, the wireless communications antenna comprising:
   a first antenna element defined by a first radiation pattern; and
   a second antenna element defined by a second radiation pattern;
   wherein the first antenna element and the second antenna element together define a directional array having a radiation pattern including a main lobe oriented toward a receptor direction, one or more sidelobes, and a backlobe, with the first antenna element being fed a first split of a radio frequency signal and the second antenna element being fed a second split of the radio frequency signal phase shifted from the first split of the radio frequency signal, radio frequency signals from each of the first antenna element and the second antenna element inducing a destructive interference minimizing the sidelobes and backlobes in the radiation pattern of the directional array and inducing a constructive interference maximizing the main lobe in the radiation pattern of the directional array within the single area occupied by the passenger without interference to adjacent areas for personal electronic devices of other passengers, based at least in part upon a tuning of a phase shift between the first split and the second split of the radio frequency signal and a minimal power output level evaluated to maintain a communication link to the one or more receiving personal electronic devices.

10. The antenna array of claim 9, wherein the first antenna element and the second antenna element are a planar inverted F antenna.

11. The antenna array of claim 10, wherein the first antenna element is a first conductive trace disposed on a printed circuit board, and the second antenna element is a second conductive trace disposed on the printed circuit board and spaced apart from the first conductive trace.

12. The antenna array of claim 11, and the printed circuit board includes a conductive element corresponding to a ground plane.

13. The antenna array of claim 9, wherein the radio frequency signal is a Bluetooth signal.

14. An antenna optimizer for transmitting to one or more receiving personal electronic devices within a single area occupied by a passenger and connectable to an antenna array including a first antenna and a second antenna, the antenna optimizer comprising:
   a power divider with an input port connected to a source of a radio frequency signal, a first output port, and a second output port connectable to the second antenna, a signal power of the radio frequency signal being split between the first output port the second output port with a first split radio frequency signal being output from the first output port and a second split radio frequency signal being output from the second output port; and
   a phase shifter connected to the first output port of the power divider and connectable to the first antenna, a phase of the first split radio frequency signal being shifted by a prescribed degree relative to the second split radio frequency signal, a combined radiation pattern of the antenna array with the first split radio frequency signal being radiated from the first antenna and the second split radio frequency signal being radiated from the second antenna defining an antenna array directivity gain toward a receptor direction within the single area occupied by the passenger without interference to adjacent areas for personal electronic devices of other passengers.

15. The antenna optimizer of claim 14, wherein the first and second split radio frequency signals radiated from each of the first and second antennas in directions other than the receptor direction are minimized.

16. The antenna optimizer of claim 14, further comprising:
- a first matching network connected to the phase shifter and the first antenna; and
- a second matching network connected to the second output of the power divider and the second antenna.

17. The antenna optimizer of claim 14, wherein the source of the radio frequency signal is a Bluetooth transmitter.

18. The antenna optimizer of claim 14, wherein one of the first or second split radio frequency signals radiated from the corresponding first or second antenna destructively interferes with the other one of the first or second split radio frequency signal radiated from the corresponding one of the first or second antenna at directions of the radiation patterns offset from the receptor direction.

19. The antenna system of claim 18, wherein the destructive interference between the first and second split radio frequency signals as radiated from the respective first and second radiating elements is a function of the prescribed degree of phase shift between the first and second radio frequency signals.

\* \* \* \* \*